United States Patent [19]

Rigamonti et al.

[11] Patent Number: 5,342,683

[45] Date of Patent: Aug. 30, 1994

[54] WATER SPREADING FILMS OR PLATES CONSISTING OF ACRYLIC POLYMERS AND PROCESS FOR THEIR PREPARATION

[75] Inventors: Marco Rigamonti; Franco Marciandi; Massimo Cesana, all of Milan, Italy

[73] Assignee: Elf Atochem Italia S.r.l., Milan, Italy

[21] Appl. No.: 67,295

[22] Filed: May 25, 1993

[30] Foreign Application Priority Data

May 27, 1992 [IT] Italy ................. MI92 A 001300

[51] Int. Cl.$^5$ ............. C09K 3/18; C09D 4/02; C09D 5/00; B32B 5/16
[52] U.S. Cl. .................. 428/331; 428/329; 428/451; 428/516
[58] Field of Search ........... 428/331, 329, 330, 412, 428/451, 516, 701

[56] References Cited

U.S. PATENT DOCUMENTS

| | | | |
|---|---|---|---|
| 3,448,215 | 1/1970 | Shepherd et al. | 117/124 D |
| 3,635,756 | 1/1972 | Shepherd et al. | 117/124 D |
| 3,865,619 | 2/1975 | Pennewiss et al. | 117/138.8 |
| 4,243,719 | 1/1981 | Holmes | 428/412 X |
| 4,478,909 | 10/1984 | Taniguchi et al. | 428/331 |
| 4,481,254 | 11/1984 | Fukushima et al. | 428/329 |
| 4,491,508 | 1/1985 | Olson et al. | 204/159.13 |
| 4,576,864 | 3/1986 | Krautter et al. | 428/328 |
| 5,134,021 | 7/1992 | Hosono et al. | 428/331 X |

FOREIGN PATENT DOCUMENTS

| | | |
|---|---|---|
| 0057906A1 | 8/1982 | European Pat. Off. |
| 0177791A3 | 4/1986 | European Pat. Off. |
| 317410 | 11/1988 | European Pat. Off. |
| 0317410 | 11/1988 | European Pat. Off. |
| 0337695A2 | 10/1989 | European Pat. Off. |
| 0374516 | 6/1990 | European Pat. Off. |
| 0439293A1 | 7/1991 | European Pat. Off. |
| 0439967A1 | 8/1991 | European Pat. Off. |
| 3400079 | 7/1985 | Fed. Rep. of Germany |

Primary Examiner—Daniel R. Zirker
Attorney, Agent, or Firm—Bryan Cave

[57] ABSTRACT

The invention concerns films or plates of acrylic polymers, in particular polymethylmethacrylate, rendered no drop by coating with a monomeric composition, polymerized and reticulated by ultraviolet light, consisting of:

a) from 50 to 70% by weight of acrylates or methacrylates of $C_1$–$C_{12}$ alkyls, $C_4$–$C_{12}$ cycloalkyl, polycycloalkyl or alkylidene having from 7 to 14 C atoms;

b) from 10 to 30% of acrylate or methacrylate of $C_2$–$C_6$ hydroxyalkyl;

c) from 10 to 30% by weight of acrylic or methacrylic acid or their salts;

d) from 1 to 10% by weight of a reticulation agent consisting of a polyfunctional acrylic monomer;

e) from 0.01 to 3% by weight of hydrophilic colloidal metal oxides;

f) from 0 to 0.06% by weight of a U.V. polymerization initiator, being 100 the sum of the a)+b)+c)+d)+e)+f) amounts.

11 Claims, No Drawings

WATER SPREADING FILMS OR PLATES CONSISTING OF ACRYLIC POLYMERS AND PROCESS FOR THEIR PREPARATION

The present invention relates to no drop and antifogging products, in particular films and plates, comprising a support consisting of acrylic polymers and a polymerized and U.V. light reticulated coating, consisting of a mixture of particular acrylic monomers and small amounts of hydrofilic metal oxides.

It is known that one of the problems faced in the use of generally transparent plates, based on thermoplastic polymers such as polymethylmethacrylate is due to the surface condensation of water in the form of small or large drops which reduce the transparence thereof.

The prior art has suggested various surface treatments of said plates in order to avoid the above inconvenience, however with poor results as regards the maintenance during the time of the conferred no drop features or by employing complicated and polluting processes or, in the case of acrylic plates, conferring unwished yellowish colouring.

It is known from DE patent 3,400,079 to treat plates of acrylic polymers, in particular polymethylmethacrylate (PMMA), by effecting a first surface coating with a layer of polymers unsoluble in water having a modest content of polar groups, applied by their solutions or dispersions, which in its turn is coated with a colloidal silica layer or colloidal metal oxides insoluble in water, applied through spraying of their solutions or dispersions.

Such a process results complex and expensive as it comprises the application of two subsequent layers, it can result as polluting for the employments of solvents and often it does not allow the achievement of good adhesions of the layers applied to the polymeric plate.

In the European patent application EP 374,516, it is described the coating of transparent plates of thermoplastic polymers, in particular of polycarbonate, with a solution formed by at least 92% by weight of organic solvents and till 8% of a mixture consisting of:
a) a curable polyfunctional acrylic monomer, in particular 1,6-hexandiol diacrylate,
b) colloidal metal oxides, in particular silica, and
c) a U.V. reticulation catalyst, in which the ratio by weight b/a varies from 1.9 to 19, and said solution is successively cured by U.V. light forming a reticulated coating containing from 65 to 95% by weight of colloidal metal oxides.

Such a process presents the inconveniences deriving from the use of high amounts of polluting and toxic solvents, from the use of remarkable amounts of a reticulation catalyst at ultraviolet rays, which can confer unwished yellowish colours to the polymeric plates, and deriving from the use of solvents and/or monomers aggressive towards the thermoplastic plate which make it opaque.

The European patent application EP 317,410 describes the treatment of polymethylmethacrylate plates (PMMA) with a mixture of acrylic monomers, comprising at least 40% by weight of acrylic or methacrylic acid, at least 0.09% by weight of a U.V. polymerization initiator, and successively polymerizing at the U.V. light the layer of applied monomers.

Such a treatment causes a certain yellowing of the PMMA plates due to the employment of notable amounts, U.V. initiators, and of considerable amounts of acrylic or methacrylic acids generally containing remarkable amounts of inhibitors causing the PMMA yellowing. Moreover, the need of employing considerable amounts of said acrylic acids, which are volatile and irritant, presents polluting problems.

It has now been found a simple and unpolluting process to make no drop and antifogging the surface of films, plates and formed articles in general, based on acrylic polymers, in particular PMMA, which does not present the inconveniences that the known processes show, consisting in coating the surface of the formed articles with a mixture of particular acrylic monomers containing small amounts of hydrophilic colloidal metal oxides and successively in polymerizing and reticulating in situ said mixture at U.V. light.

The process can be carried out in any only continuous phase integrated with the preparation of the formed article. In the process are not employed organic solvents, and, normally, U.V. polymerization initiators are not employed or only in limited amounts lower than 0.06%.

The so obtained formed articles have high no drop and antifogging properties, good surface hardness, negligible or, anyway, very low yellowing indexes, good antistatic properties and in the case of transparent articles they substantially maintain unchanged their transparency.

Moreover the so applied no drop layer has a high adhesion to the surface of the formed article, it results stable, resistant to abrasion and to washing away and maintains unchanged during the time its characteristics.

Object of the present invention are products such as films, plates and formed articles with no drop and antifogging characteristics comprising a support consisting of acrylic polymers and a coating having the following composition:

a) from 50% to 70% by weight of acrylic monomers having the formula:

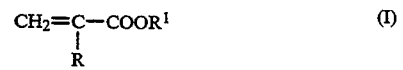

in which: R is H, $CH_3$; $R^1$ is $C_1$–$C_{12}$ alkyl, $C_4$–$C_{12}$ cycloalkyl, polycycloalkyl and alkylidene having from 7 to 14 carbon atoms;

b) from 10 to 30% by weight of monomers having the formula:

or of their oligomers in which: R has the meaning above stated; $R^2$ is a $C_2$–$C_6$ hydroxyalkyl or an ethoxylic group $(CH_2-CH_2O)_n-H$, where n is a whole number from 1 to 10;

c) from 10 to 30%, preferably from 15 to 20% by weight of acrylic or methacrylic acid or of acrylic or methacrylic monomers containing a group of formula:

or preferably their dimers, optionally and preferably partially salified, in preference up to 10%, preferably with ammonia, metal or ammonium ions, in which R has the meaning above stated;

d) from 1 to 10% of a reticulation agent consisting of one or more acrylic or methacrylic esters of a polyfunctional alcohol;

e) from 0.01 to 3%, preferably 0.05–1%, more preferably 0.1–0.5% by weight of hydrophilic colloidal metal oxides;

f) from 0 to 0.06% by weight of a U.V. polymerization initiator, being 100 the sum of a)+b)+c)+d)+f), and in which said coating has been polymerized and reticulated through U.V. rays.

As acrylic polymers forming the support there may be employed polymers and copolymers, generally transparent, of esters of acrylic or methacrylic acid, preferably polymethylmethacrylate (PMMA) or its transparent alloys with e.g. polyvinylchloride (PVC) and polyvinylidene fluoride (PVdF).

As monomer having the formula (a) there are preferably employed methylmethacrylate or its syrups with polymethylmethacrylate or dicyclopentadienyl methacrylate. As monomers of formula (b), hydroxyethyl- and hydroxypropylacrylates or methacrylates can be employed, preferably alpha-hydroxyethylmethacrylate.

As compounds mentioned in c) there can be employed, e.g., acrylic acid, methacrylic acid, β-carboxyethylacrylic acid and zinc, ammonium or sodium diacrylate.

As reticulation agents, e.g., pentaerythrite triacrylate and hexandiol diacrylate, EGDM ethylenglycol dimethacrylate, TEGDM tetraethylenglycol dimethacrylate, dimethylol propane triacrylate, can be employed.

As hydrophilic colloidal metal oxides, there can be employed, e.g., hydrophilic colloidal silica, obtained by precipitation such as TYXOSY38 L® of Rhône-Poulenc or by combustion such as HDK N20® of Wacker, as well as aluminium hydroxide, preferably colloidal silica are employed.

If it is useful to employ small amounts of a U.V. polymerization initiator, it is preferable be based on benzophenone such as ESACURE KT 37® and UVECRYL P115® of Fratelli Lamberti, or Irgacure 500® of CIBA-GEIBY. Also Darocur 1173® and the other compounds indicated in the above mentioned EP Patent 374,516 can be utilized.

The process for making no drop and antifogging products consisting of films, plates and formed articles of acrylic polymers, consists in applying on the surface of said products a homogeneous layer of the monomeric composition consisting, as previously indicated, of a)+b)+c)+d)+e+f) and then submitting the so coated product to a ultraviolet radiation in order to polymerize and reticulate said coating layer.

Due to its simplicity and versatility the process can be continuously carried out in an industrial plant integrated with the preparation of the formed product of support, in particular with the manufacture by filming or extrusion of acrylic films and plates:

More particularly the process can be industrially carried out in line by directly and continuously applying on extruded plates, for example PMMA plates, in particular double-walled, as they come out from an extrusion die, the monomeric mixture and, always in continuous, by submitting the so coated plates to a radiation of U.V. lamps, with the further advantage that the evaporation of the monomers forming the applied mixture is thus reduced to a minimum.

The monomers layer, being the mixture viscosity adjustable at will, through variation of the monomers, polymers and silica percentages, can be applied with any of the coating method industrially employed such as, e.g., spraying or spreading so as to form a homogeneous layer.

The plate surface is preferable quite clean and smooth to avoid dishomogeneity during the polymerization phase.

The thickness of the applied monomeric layer can vary from about 0.5 μm to 30 μm.

Normally it is not necessary to employ U.V. polymerization initiators, however in case of thicnesses of the monomeric layer higher than 10 μm it is preferable to employ small amounts of such initiators to have a quicker polymerization and reticulation in the layer depth.

Thicknesses lower than 10 μm are already sufficient to obtain, according to the present invention, U.V. polymerized coatings having good adhesion, resistant to abrasion, to washing away and the wished no drop and antifogging properties.

The polymerization and reticulation of the monomeric layer are carried out by exposition to U.V. radiation. It is unnecessary to operate in unaerobic ambient, however, for relatively long exposure times to U.V. rays, it is advisable to operate in nitrogen atmosphere in order to avoid the inhibition due to oxygen.

Obviously the polymerization and therefore the exposure times to U.V. rays can vary within wide limits depending from various factors, such as for example the kind of utilized monomers, the type and the power of the utilized U.V. lamp, the thickness of the monomeric coating and its distance from the lamp, the viscosity of the monomeric mixture, the support temperature, etc.

By operating, however, according to the present invention, and in absence of U.V. initiators, it is possible to employ very short irradiation times from a few seconds to about 15 minutes, according to the power of the U.V. lamps. It is preferable to use high power U.V. lamps.

To verify the effectiveness of both no drop and antifogging conferred treatment, tests on PMMA plates samples, coated according to the process of the present invention, and on comparative plates samples, have been carried out.

For carrying out the test a thermostatic bath has been utilized with water at 50° C. above which the coated plates have been placed inclined of 18°–23°, with the coated surface in contact with the vapour, placed side by side with the comparative uncoated ones.

In the antifogging evaluation it is determined the time necessary for a visual disappearance of the fogging of the plate.

The plates are maintained over the thermostatic bath for at least 15 days in order to evaluate if the coating remains adherent in the time and if the no drop and antifogging properties remain unvaried in the time.

In the no drop test it is gauged the condensed water amount, which by flowing collects at the bottom of each inclined plate, within a period of 24 hours.

At the end of the tests both the haze and the plate final transmittances have been measured.

Some examples follow with an illustrative purpose.

EXAMPLE 1

A PMMA plate has been covered by spreading with a 15 μm thick layer of a mixture containing 55% by weight of methylmethacrylate (as a syrup containing about 13 parts of PMMA and 87 parts of monomer), 20% by weight of alpha-hydroxyethylmethacrylate (HEMA), 18% by weight of acrylic acid (AA), 6.98% of the reticulating agent pentaerythrite triacrylate (PETIA) and 0.02% by weight of colloidal silica. Philips lamps HPK 125 (about 25 W/cm) have been applied by keeping the plate at 20 cm from the lamps and for a period of 10 minutes.

The plate has been tested over thermostatic bath with water at 50° C., with external room temperature and showed antifogging properties also after one month.

The water condensate, gauged in 24 hours, is about three times the one of an uncoated polymethylmethacrylate plate.

After one month the haze has been 7% and the transmittance 89% in comparison with an initial value of 1% and 92%, respectively.

EXAMPLE 2

The same formulation of Example 1 has been polymerized with 80 W/cm UV lamps in an indutrial UV oven. The polymerization time has been about 4 seconds by maintaining a distance of 20 cm of the plates from the lamps.

The no dropping and antifogging behaviour is similar to the one of example 1, the haze after one month resulted to be 5%.

EXAMPLE 3

A mixture containing 60% by weight of MMA (syrup containing 13 parts of polymer and 87 parts of monomer), 20% by weight of HEMA, 15% by weight of AA and 4.9% of PETIA, in which 0.1% by weight of colloidal silica (HDK N 20) has been dispersed, has been laid on a PMMA plate for a 10 thickness of $\mu$m and let polymerize by UV as in example 1.

The plate shows antifogging properties for at least one month and the condensate gauged after 24 hours is about four times the one of an untreated PMMA plate.

EXAMPLE 4

A mixture containing 55% of MMA (as syrup described in example 1), 25% of HEMA, 5% of AA, 5% of zinc diacrylate, 9.98% of PETIA and 0.02% by weight of colloidal silica, has been well mixed and let polymerize with the process described in example 1.

One obtains an initial antifogging effect quicker than the one obtained in example 1.

COMPARATIVE EXAMPLE A

A PMMA plate has been coated by spreading with a layer of 20 $\mu$m of a mixture containing 40% by weight of methylmethacrylate, 50% by weight of acrylic acid (AA), 9.75% of the reticulating agent pentaerythrite triacrylate (PETIA) and 0.25 of U.V. catalyst (IRGACURE 500®). Philips lamps HPK 125 (about 25 W/cm) have been applied, by keeping the plate at 20 cm from the lamps and for a period of 15 minutes.

The plate has been tested over thermostatic bath with water at 50° C., with external room temperature and after 2 days showed no antifogging properties.

COMPARATIVE EXAMPLE B

Comparative Example A has been repeated with the difference that methacrylic acid instead of the acrylic acid has been used.

The results are similar to the ones of the comparative Example A.

We claim:

1. Articles, films, and plates having water-spreading and antifogging characteristics, said articles, films and plates comprising a transparent acrylic support having a crosslinked, U.V. polymerized coating, said coating comprising the following components:
   (a) from 50 to 70% by weight of acrylic monomers having the formula:

in which: R is H or $CH_3$; $R^1$ is selected from the group consisting of $C_1$-$C_{12}$ alkyl, $C_4$-$C_{12}$ cycloalkyl, polycycloalkyl and alkylidene having from 7 to 14 carbon atoms;
   (b) from 10 to 30% by weight of monomers having the formula:

or of their oligomers in which: R has the above stated meaning; $R^2$ is $C_2$-$C_6$ hydroxyalkyl or an ethoxylic group $(CH_2$—$CH_2O)_n$—H where n is a whole number from 1 to 10;
   (c) from 10 to 30% by weight of acrylic or methacrylic acid or of acrylic or methacrylic monomers having a group of the formula:

or their dimers, in which R has the above defined meaning;
   (d) from 1 to 10% of a crosslinking agent consisting of one or more acrylic or methacrylic esters of a polyfunctional alcohol;
   (e) from 0.01 to 3% by weight of hydrophilic colloidal metal oxides or hydrophilic colloidal silica; and
   (f) from 0 to 0.06% by weight of a U.V. polymerization initiator, the sum of a)+b)+c)+d)+e)+f) being 100%.

2. Articles, films and plates according to claim 1, in which the acrylic support is selected from the group consisting of polymers and copolymers of esters of acrylic or methacrylic acid.

3. Articles, films and plates according to claim 1, in which the acrylic support comprises polymethylmethacrylate.

4. Articles, films and plates according to claim 1, in which the monomer of component a) is selected from the group consisting of methylmethacrylate and its syrups with polymethylmethacrylate or dicyclopentadienyl methacrylate.

5. Articles, films and plates according to claim 1, in which the monomers of component b) are selected from the group consisting of hydroxyethyl or hydroxypropyl acrylates and methacrylates.

6. Articles, films and plates according to claim 1, in which component c) is selected from the group consisting of acrylic or methacrylic acid, $\beta$-carboxyethylacrylic acid and zinc or ammonium diacrylate.

7. Articles, films and plates according to claim 1, in which the crosslinking agent is selected from the group consisting of pentaerythrite triacrylate and hexandiol diacrylate.

8. Articles, films and plates according to claim 1, in which the colloidal metal oxide is colloidal aluminum hydroxide.

9. Articles, films and plates according to claim 5 in which the monomer of component (b) is α-hydroxyethylmethacrylate.

10. Articles, films and plates according to claim 1, in which said coating comprises 15–20% by weight of component (c).

11. Articles, films and plates according to claim 1, in which the dimers of component (c) are partially salified with ammonia, metal or ammonium ions.

* * * * *